(12) United States Patent
Vemuri et al.

(10) Patent No.: US 12,501,466 B2
(45) Date of Patent: Dec. 16, 2025

(54) SYSTEM AND METHOD FOR WIRELESS DATA TRANSMISSION FROM MOBILE USER EQUIPMENT DURING LOW POWER OPERATION

(71) Applicant: GM GLOBAL TECHNOLOGY OPERATIONS LLC, Detroit, MI (US)

(72) Inventors: Venkata Naga Siva Vikas Vemuri, Farmington Hills, MI (US); Scott T. Droste, West Bloomfield, MI (US); Andrew J. MacDonald, Grosse Pointe Park, MI (US); John Sergakis, Bloomfield Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 337 days.

(21) Appl. No.: 18/364,607

(22) Filed: Aug. 3, 2023

(65) Prior Publication Data

US 2025/0048412 A1   Feb. 6, 2025

(51) Int. Cl.
*H04W 72/54* (2023.01)
*H04W 72/51* (2023.01)
*H04L 67/12* (2022.01)

(52) U.S. Cl.
CPC ........... *H04W 72/54* (2023.01); *H04W 72/51* (2023.01); *H04L 67/12* (2013.01)

(58) Field of Classification Search
None
See application file for complete search history.

(56) References Cited

U.S. PATENT DOCUMENTS

2022/0209835 A1* 6/2022 Zhou ...................... H04B 1/006
2025/0048412 A1* 2/2025 Vemuri ................. H04W 48/20

FOREIGN PATENT DOCUMENTS

EP             3955696 A1    2/2022

* cited by examiner

*Primary Examiner* — Christopher T Wyllie
(74) *Attorney, Agent, or Firm* — Quinn IP Law

(57) ABSTRACT

A telematics system for a mobile UE includes a telematics controller that is configured to communicate via a plurality of communication channels. The telematics controller determines, for each of the communication channels, a parameter related to data throughput and energy consumption to effect an uplink communication between the telematics controller and a second device when the mobile UE is in a low-power operating mode. The parameter related to data throughput and energy consumption to effect the uplink communication is compared with a threshold. One of the communication channels is selected based upon the parameter related to data throughput and energy consumption to effect the uplink communication. The telematics controller communicates with the second device via the one of the plurality of communication channels when the mobile UE is in the low-power operating mode.

20 Claims, 2 Drawing Sheets

SYSTEM AND METHOD FOR WIRELESS DATA TRANSMISSION FROM MOBILE USER EQUIPMENT DURING LOW POWER OPERATION

INTRODUCTION

The concepts described herein are related to wireless communication from a mobile user equipment (UE) to a second device in which a plurality of communication paths are available for concurrent transmission of data packets.

Energy costs associated with powering devices to process and transmit data have become a significant part of network operating expenses. The energy costs become more critical under discontinuous reception (DRX) modes in a low power operating state of a mobile UE, such as when the mobile UE is a motorized vehicle that is in an ignition-off state.

DRX (Discontinuous Reception) is a power-saving feature used in devices employed in communication networks, e.g., LTE (Long-Term Evolution) networks, to reduce power consumption in mobile UEs by periodically turning off the mobile UE when there is no data to be transmitted or received. With DRX, a mobile UE may inform the network that it is going to sleep for a period of time, during which the network will buffer any incoming data until the mobile UE wakes up. This reduces the need for the mobile UE to continuously monitor the network, which may lead to significant power savings.

In LTE, there are several types of DRX modes, including DRX-idle mode and DRX-connected mode. In the DRX-idle mode, the mobile UE periodically wakes up to check for paging messages from the network, while in the DRX-connected mode, the mobile UE enters a sleep mode while waiting for data to be transmitted from the network.

The DRX modes may extend the battery life of mobile UEs, especially in applications where the data traffic is intermittent, such as voice calls or messaging applications. However, it may also introduce delays in data transmission, as the network buffers data until the mobile UE wakes up, which may not be suitable for applications that require real-time data transmission, such as video streaming or online gaming.

SUMMARY

There is a need to wirelessly communicate with a mobile communication device to deliver high-quality content in the form of data packets, etc., including wireless communication to a mobile communication device such as may be employed on a motor vehicle or other ground-based user equipment (mobile UE) that has multiple wireless communication technologies. This includes delivering content in a manner that comprehends and optimizes energy consumption under power-off conditions, e.g., an ignition-off condition when the mobile communication device is deployed on a motor vehicle.

To extend battery life, a mobile UE may utilize a radio resource control protocol (RRC) that is configured with a Discontinuous Reception (DRX) cycle. A DRX configuration in an LTE environment involves setting the parameters that determine when and how long a mobile UE will enter sleep mode. These parameters may be configured by a network operator and may vary depending on the specific network deployment and characteristics of the mobile UE.

The concepts described herein provide for a system and associated method to optimize wireless communication in a mobile UE, such as a ground vehicle, that employs a multipath telematics control platform (TCP) or MPTCP. The concepts include a system and associated method to optimize wireless communication from a mobile UE that employs MPTCP during a low power operating mode (e.g., an ignition-off mode).

An aspect of the disclosure may include a telematics system for a mobile UE that includes a telematics controller, wherein the telematics controller is configured to communicate via a plurality of communication channels. The telematics controller includes an instruction set that is executable to determine, for each of the plurality of communication channels, a parameter related to data throughput and energy consumption to effect an uplink communication between the telematics controller and a second device when the mobile UE is in a low-power operating mode. The parameter related to data throughput and energy consumption to effect the uplink communication between the telematics controller and the second device is compared with a threshold, and one of the plurality of communication channels is selected, wherein the parameter related to data throughput and energy consumption to effect the uplink communication between the telematics controller and the second device for the one of the plurality of communication channels is greater than the threshold. The telematics controller communicates with the second device via the one of the plurality of communication channels when the mobile UE is in the low-power operating mode.

Another aspect of the disclosure may include the parameters related to data throughput and energy consumption being a guaranteed bit rate (GBR) for the uplink communication for a respective one of the plurality of communication channels.

Another aspect of the disclosure may include the parameters related to data throughput and energy consumption being a reference signal reserved power (RSRP), a reference signal reserved quality (RSRQ), and a signal-to-noise ratio (SNR).

Another aspect of the disclosure may include executing an apriority scanning routine to determine, for each of the plurality of communication channels, the parameters related to data throughput and energy consumption to effect the uplink communication between the telematics controller and the second device when the mobile UE is in the low-power operating mode.

Another aspect of the disclosure may include the instruction set being executable to select a second of the plurality of communication channels, wherein the parameters related to data throughput and energy consumption to effect the uplink communication between the telematics controller and the second device for the second of the plurality of communication channels is greater than the threshold.

Another aspect of the disclosure may include the instruction set being executable to communicate between the telematics controller and the second device via the one of the plurality of communication channels and the second of the plurality of communication channels when the mobile UE is in the low-power operating mode.

Another aspect of the disclosure may include the plurality of communication channels being at least one of 3G, 4G, 4G LTE, 5G, 6G, DSRC, and WiFi.

Another aspect of the disclosure may include the instruction set being executable to execute an uplink communication from the telematics controller to the second device via the one of the plurality of communication channels when the mobile UE is in the low-power operating mode.

Another aspect of the disclosure may include the low-power mode being a discontinuous reception (DRX) idle mode.

Another aspect of the disclosure may include the instruction set being executable to deselect a second of the plurality of communication channels, wherein the parameters related to data throughput and energy consumption to effect the uplink communication between the telematics controller and the second device for the second of the plurality of communication channels is less than the threshold; and disable communication between the telematics controller and the second device via the second of the plurality of communication channels when the mobile UE is in the low-power operating mode.

Another aspect of the disclosure may include the telematics controller employing a radio resource control (RRC) protocol to manage communication between the telematics controller and the second device when the mobile UE is in the low-power operating mode.

Another aspect of the disclosure may include the telematics controller proportionately allocating communication via the plurality of available channels based upon a target communication rate and a plurality of communication rates associated with the plurality of available communication channels.

The above summary is not intended to represent every possible embodiment or every aspect of the present disclosure. Rather, the foregoing summary is intended to exemplify some of the novel aspects and features disclosed herein. The above features and advantages, and other features and advantages of the present disclosure, will be readily apparent from the following detailed description of representative embodiments and modes for carrying out the present disclosure when taken in connection with the accompanying drawings and the claims.

BRIEF DESCRIPTION OF THE DRAWINGS

One or more embodiments will now be described, by way of example, with reference to the accompanying drawings, in which.

Figure 1:
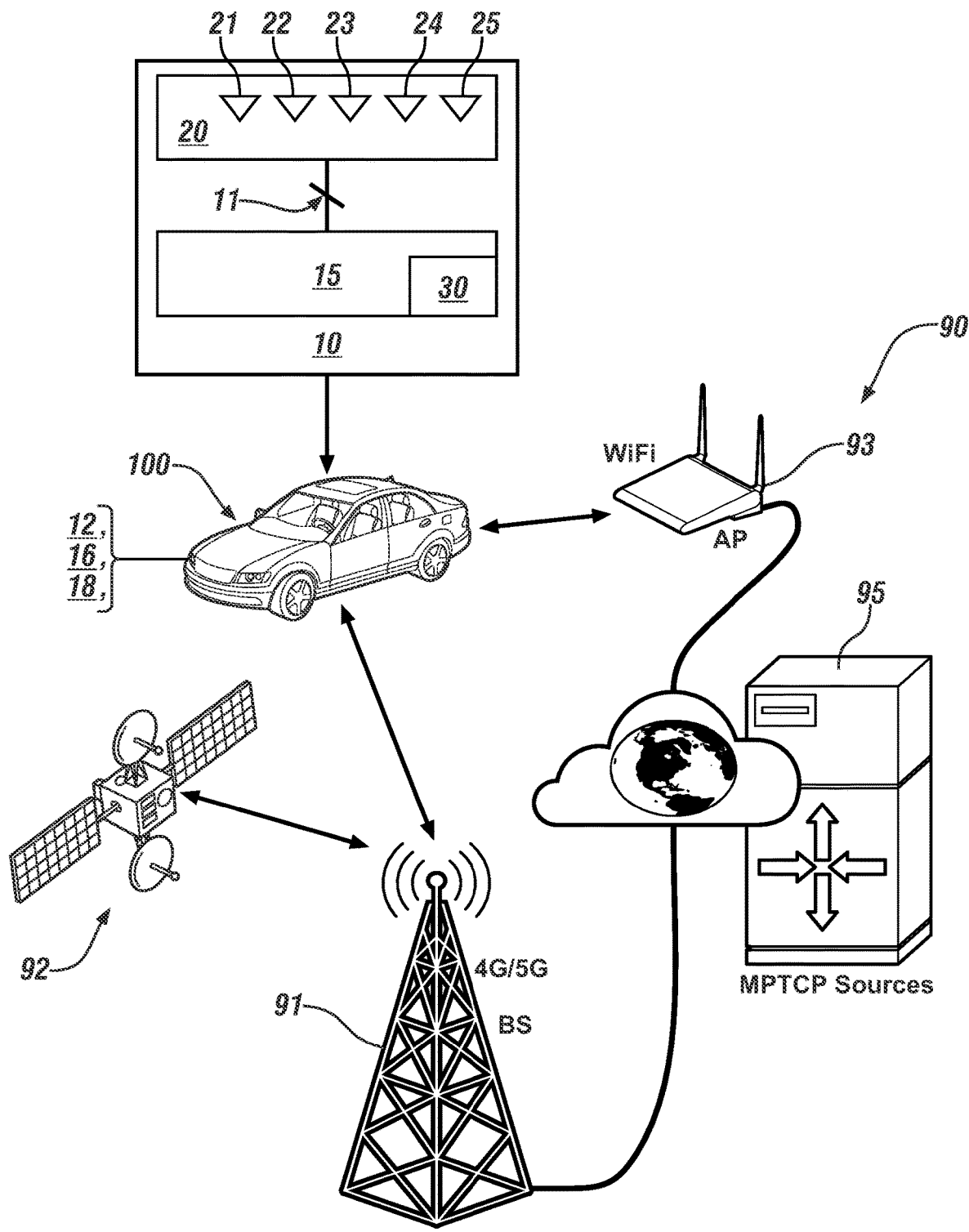
FIG. 1 pictorially illustrates a wireless telematics system including a first device having a telematics controller in communication with a first antenna array and a second device having a second controller in communication with a second antenna array, in accordance with the disclosure.

The present disclosure is susceptible to various modifications and alternative forms, and some representative embodiments have been shown by way of example in the drawings and will be described in detail herein. Novel aspects of this disclosure are not limited to the forms illustrated in the drawings. Rather, the disclosure is intended to cover modifications, equivalents, combinations, or alternatives falling within the spirit and scope of the disclosure as defined by the appended claims.

DETAILED DESCRIPTION

The following detailed description is merely exemplary in nature and is not intended to limit the application and uses. Furthermore, the drawings are in simplified form and are not to precise scale. For purposes of convenience and clarity, directional terms such as top, bottom, left, right, up, over, above, below, beneath, rear, and front, may be used with respect to the drawings. These and similar directional terms are not to be construed to limit the scope of the disclosure.

Furthermore, the disclosure, as illustrated and described herein, may be practiced in the absence of an element that is not specifically disclosed herein.

The use of ordinals such as first, second and third does not necessarily imply a ranked sense of order, but rather may distinguish between multiple instances of an act or structure.

As used herein, the term "system" may refer to one of or a combination of mechanical and electrical actuators, sensors, controllers, application-specific integrated circuits (ASIC), combinatorial logic circuits, software, firmware, and/or other components that are arranged to provide the described functionality.

The term "signal" refers to a physically discernible indicator that conveys information, such as a data packet, and may be a suitable waveform (e.g., electrical, optical, magnetic, mechanical or electromagnetic), such as DC, AC, sinusoidal-wave, triangular-wave, square-wave, vibration, and the like, that is capable of traveling through a medium.

Referring to the drawings, wherein like reference numerals are used to identify like or identical components in the various views, FIG. 1 pictorially depicts a wireless communication environment that includes an embodiment of user equipment (UE) 100 having a telematics system 10. In one embodiment and as shown, the UE 100 is a ground vehicle, and the telematics system 10 is configured with a multipath telematics control platform (TCP) or MPTCP, that is configured to communicate via one of or a plurality of communication channels 11.

The MPTCP of the telematics system 10 enables and facilitates the aggregation of multiple wireless or radio communication technologies, including, by way of non-limiting examples, one or more of satellite communication, cellular communication (3G, 4G, 4G LTE, 5G, etc.), WiFi communication, DSRC, etc., for improved network communication performance, which allows for robust handoffs, and optimally provides for uninterrupted Internet connectivity.

The telematics system 10 is a communication system that is capable of extra-vehicle communication for communicating with a communication network system having wireless and/or wired capabilities. Extra-vehicle communication includes short-range vehicle-to-vehicle (V2V) communication and/or vehicle-to-everything (V2X) communication. This may include communication with an infrastructure monitor, e.g., a traffic camera, and communication to a proximal pedestrian, etc. Alternatively, or in addition, the telematics system 10 may be capable of short-range wireless communication to a handheld device, e.g., a cell phone, a satellite phone or another telephonic device, referred to as Dedicated Short Range Communication (DSRC). In one embodiment the handheld device is loaded with a software application that includes a wireless protocol to communicate with the telematics system 10, and the handheld device executes the extra-vehicle communication for communicating with an off-board controller via a communication network 90, which may be in the form of a satellite 92, a cell tower antenna 91, WiFi 93, and/or another mode of communication, all of which are configured to effect communication with a remotely located second device, controller, or system 95. In one embodiment, the remotely located second device or second system 95 is cloud-based. The telematics system 10 may also include a global position system (GPS) sensor that may be employed by a navigation system 16.

In one embodiment. The UE 100 is a ground vehicle that includes a drivetrain 12, telematics system 10, and the navigation system 16, and may also include an advanced driving assistance system (ADAS) 18 that provides a level of autonomous vehicle control.

The telematics system 10 includes a telematics controller 15 that is capable of effecting wireless communication via the plurality of communication channels 11 via an antenna array 20, wherein the telematics system 10 is arranged to wirelessly communicate with other devices. In one embodiment, the telematics system 10 is affixed onto UE 100, which may include, but is not limited to, a mobile platform in the form of a commercial vehicle, industrial vehicle, agricultural vehicle, passenger vehicle, aircraft, watercraft, train, all-terrain vehicle, personal movement apparatus, robot, and the like to accomplish the purposes of this disclosure.

Wireless communication between devices includes conveying signals in the form of one or a stream of data packets. Data may be segmented into multiple data packets for transmission, with the data packets being reassembled upon reaching the destination. A packet has a header and a payload. The header keeps overhead information about the packet, the service, and other transmission-related data. For example, data transfer over the Internet requires breaking down the data into IP packets, which is defined in IP (Internet Protocol), and an IP packet includes: a source IP address, which is the IP address of the machine sending the data; a destination IP address, which is the machine or device to which the data is sent; a sequence number of the packets, a number that puts the packets in order such that they are reassembled in a way to get the original data back exactly as it was prior to transmission; a type of service; flags; and a payload, which represents the bulk of the packet (all the above is considered as overhead), and is actually the data being carried. A data packet may also be referred to as a datagram, a segment, a block, a cell or a frame, depending on the protocol used for the transmission of data.

The antenna array 20 is composed as a plurality of antennas that are configured to execute wireless communication, including, in one embodiment, a cellular antenna 21, a WiFi (Wireless Fidelity) antenna 22, a LiFi (Light Fidelity) antenna 23, a radiofrequency antenna 24, and/or a second antenna 25. The second antenna 25 may be configured as a second cellular antenna, a second WiFi antenna 22, a second LiFi antenna, or a second radiofrequency antenna. The plurality of antennas may provide one or a plurality of communication links between the telematics system 10 and another device, e.g., the second system 95. The term "LiFi" is derived from the phrase "light fidelity", and is a bidirectional wireless system that transmits data via LED or infrared light. The term "WiFi" is derived from the phrase "wireless fidelity", and is a family of wireless network protocols, based on the IEEE 802.11 family of standards, that is used for local area networking of electronic devices such as cell phones, computers, etc. The cellular antenna 21 may be capable of one or more of the following communication protocols: 3G, 4G, 4G LTE, 5G, 6G, etc.

One or more of the plurality of antennas of the antenna array 20 described herein may be absent in some embodiments. Stated differently, some embodiments of the antenna array 20 of the telematics system 10 may include a subset of the cellular antenna 21, WiFi antenna 22, LiFi antenna 23, radiofrequency antenna 24, and the other antenna 25.

The telematics controller 15 includes a non-transitory computer-readable storage medium 30 having a plurality of instructions stored therein, which, when executed, cause the telematics controller 15 to perform specific operations. Exemplary instructions include routine 200, which is described with reference to FIG. 2.

The telematics controller 15 may be composed to include read only memory (ROM) and random access memory (RAM), processor-executable instructions and one or more processors that execute the processor-executable instructions, including the non-transitory computer-readable storage medium 30. In embodiments where the telematics controller 15 includes two or more processors, the processors may operate in a parallel or distributed manner. The telematics controller 15 may also execute an operating system of the telematics system 10.

The term "controller" and related terms such as microcontroller, control, control unit, processor, etc. refer to one or various combinations of Application Specific Integrated Circuit(s) (ASIC), Field-Programmable Gate Array(s) (FPGA), electronic circuit(s), central processing unit(s), e.g., microprocessor(s) and associated non-transitory memory component(s) in the form of memory and storage devices (read only, programmable read only, random access, hard drive, etc.). The non-transitory memory component is capable of storing machine readable instructions in the form of one or more software or firmware programs or routines, combinational logic circuit(s), input/output circuit(s) and devices, signal conditioning, buffer circuitry and other components, which may be accessed by and executed by one or more processors to provide a described functionality. Input/output circuit(s) and devices include analog/digital converters and related devices that monitor inputs from sensors, with such inputs monitored at a preset sampling frequency or in response to a triggering event. Software, firmware, programs, instructions, control routines, code, algorithms, and similar terms mean controller-executable instruction sets including calibrations and look-up tables. Each controller executes control routine(s) to provide desired functions. Routines may be executed at regular intervals, for example every 100 microseconds during ongoing operation. Alternatively, routines may be executed in response to occurrence of a triggering event.

The concepts described herein relate to wireless communication between an embodiment of a mobile UE 100 having an embodiment of the telematics system 10 having multiple transmission paths and a second system or device, wherein the wireless communication achieves at least a minimum throughput while minimizing energy consumption. This advantageously includes achieving a minimum throughput while minimizing energy consumption when the mobile UE 100 is in an ignition-off mode with the telematics system 10 operating in the DRX-idle mode.

The minimum throughput may be quantized as a guaranteed bitrate (GBR).

The concepts described with reference to FIG. 2, with continued reference to the UE 100 including telematics system 10, controller 15, and antenna array 20 of FIG. 1, provide various aspects and details related to executing instructions stored on the non-transitory computer-readable storage medium 30 of the telematics controller 15 to effect communication.

Figure 2:
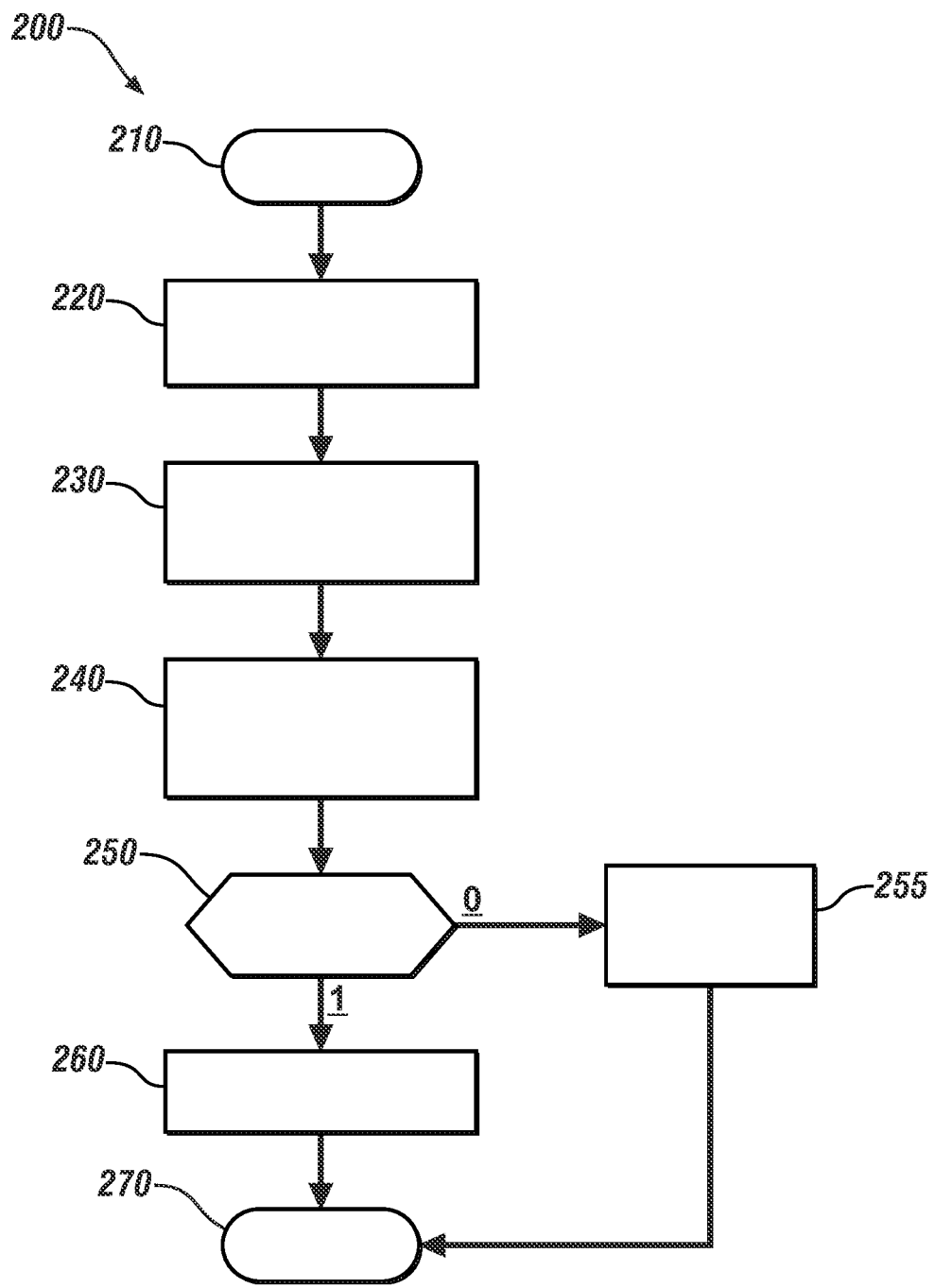
FIG. 2 schematically illustrates a first algorithm that is executable in the first device to evaluate availability of multi-channel communication links, in accordance with the disclosure.

FIG. 2 schematically illustrates a routine 200, in the form of an algorithm that is stored in an embodiment of the computer-readable storage medium 30 of the telematics controller 15 that is described with reference to FIG. 1.

The telematics controller 15 is configured to communicate via a plurality of communication channels 11, as described with reference to FIG. 1.

Referring again to FIG. 2, details related to the routine 200 are described, and include determining, for each of the plurality of communication channels 11, a parameter related to data throughput and energy consumption to effect an uplink communication between the telematics controller and a second device when the mobile UE 100 is in a low-power operating mode, e.g., in an ignition-off mode.

The routine 200 is illustrated as a collection of blocks in a logical flow graph, and represents a sequence of operations that may be implemented in hardware, software, or a combination thereof. The routine 200 may reside in the storage medium 30 of the telematics controller 15 of the telematics system 10, and be executable in the telematics controller 15. In the context of software, the blocks represent computer instructions that, when executed by one or more processors, perform the recited operations. For convenience and clarity of illustration, the method is described with reference to the UE 100 that is described with reference to FIG. 1. Table 1 is provided as a key wherein the numerically labeled blocks and the corresponding functions are set forth as follows.

TABLE 1

| BLOCK | BLOCK CONTENTS |
| --- | --- |
| 210 | Initiate operation in DRX-idle mode |
| 220 | Scan channels |
| 230 | Determine parameters related to data throughput and energy consumption for the channels |
| 240 | Compare parameters for channels to thresholds |
| 250 | Are parameters greater than thresholds for channel? |
| 255 | Eliminate channel |
| 260 | Accept channel |
| 270 | Communicate accepted channel(s) to RRC |

Execution of the routine 200 may proceed as follows. The steps may be executed in a suitable order, and are not limited to the order described with reference to FIG. 2. As employed herein, the term "1" indicates an answer in the affirmative, or "YES", and the term "0" indicates an answer in the negative, or "NO".

When the mobile UE 100 is in a low-power operating mode, e.g., in an ignition-off mode, the routine 200 may periodically initiate, or be initiated in response to an internally generated prompt or an externally generated prompt (Step 210).

In response, the routine 200 scans the plurality of communication channels 11 (Step 220) to determine, for each of the plurality of communication channels, the parameters related to data throughput and energy consumption to effect the uplink communication between the telematics controller and the second device when the mobile UE is in the low-power operating mode. This may include executing an apriority scanning routine to determine, for each of the plurality of communication channels, the parameters related to data throughput and energy consumption to effect the uplink communication between the telematics controller and the second device when the mobile UE is in the low-power operating mode.

The routine determines parameters related to data throughput and energy consumption for the plurality of channels 11 based thereon (Step 230). The parameters related to data throughput for the plurality of channels 11 that are determined during Step 230 include, by way of non-limiting examples, signal-to-noise ratio (SNR), reference signal received power (RSRP), received signal strength indicator (RSSI), and reference signal received quality (RSRQ). The parameters related to energy consumption for each of the plurality of channels 11 that are determined during Step 230 include, by way of non-limiting example, a total energy consumed (E). The total energy consumed (E) (in Joules) is determined based upon the quantity (bits) of data to be transmitted (D), the expected transmission rate for the respective channel (R), the transmission time, and the energy per bit ($E_{bt}$).

The total energy consumed (E) and the associated SNR, RSRP, RSSI, and RSRQ for each of the plurality of channels 11 are compared to respective minimum thresholds (Step 240).

Individual ones of the plurality of channels 11 may be accepted based upon the comparison of the total energy consumed (E) and the associated SNR, RSRP, RSSI, and RSRQ for the respective one of the plurality channels 11 in relation to the respective thresholds (Step 250)(1), with the specific channel being added to a radio resource control (RRC) list (Step 260). One or multiple ones of the plurality of channels 11 may be accepted.

Individual ones of the plurality of channels 11 may be rejected based upon the comparison of the total energy consumed (E) and the associated SNR, RSRP, RSSI, and RSRQ for the respective one of the plurality channels 11 in relation to the respective thresholds (Step 250)(0), with the specific channel being eliminated from the radio resource control (RRC) list (Step 255). One or multiple ones of the plurality of channels 11 may be rejected.

The RRC list, including the one or multiple ones of the plurality of channels 11 that are accepted at Step 250, are compiled and communicated to the second system 95 and employed by the RRC to effect communication therewith (Step 270).

The RRC or radio resource control is a network layer protocol that may be used between the UE 100 and the second system 95 to manage signal exchanges. The functions of the RRC protocol include connection establishment and release functions, broadcast of system information, radio bearer establishment, reconfiguration and release, RRC connection mobility procedures, paging notification and release and outer loop power control. The RRC configures the UE 100 according to the network status and allows for Radio Resource Management strategies to be implemented. The operation of the RRC may be guided by a state machine that defines certain specific states that a UE may be present in. The different states in this state machine have different amounts of radio resources associated with them and these are the resources that the UE may use when it is present in a given specific state. Since different amounts of resources are available at different states the quality of the service that the user experiences and the energy consumption of the UE are influenced by this state machine.

By conveying to the RRC the accepted channel(s) of the plurality of channels 11, the UE 100 is able to control the energy consumed during the DRX-idle data transmission and the quality of the data transmission. This enables and facilitates carrier aggregation for the multiple wireless or radio communication technologies, including, by way of non-limiting examples, one or more of satellite communication, cellular communication (3G, 4G, 4G LTE, 5G, etc.), WiFi communication, DSRC, etc., for improved network communication performance. This allows for robust hand-offs between the channels, and provides for uninterrupted Internet connectivity.

The telematics controller 15 executes the instructions stored in the non-transitory computer-readable storage medium 30 to perform operations that include determining a target communication rate for communicating a plurality of data packets between the telematics controller 15 and second controller 95, identifying a plurality of available wireless communication links between the telematics controller 15 and the second controller 95, and determining a plurality of communication rates associated with the plurality of available wireless communication links. The wireless communication links are defined by the plurality of antennas of the antenna array 20.

A proportionate allocation of the plurality of available wireless communication links is determined based upon the target communication rate and the plurality of communication rates associated with the plurality of available wireless communication links, and the energy cost, especially when the mobile UE is in an idle mode. A plurality of concurrent wireless transmissions of the plurality of data packets are executed via the plurality of available wireless communication links and are based upon the proportionate allocation of the plurality of available wireless communication links to achieve the target communication rate optimized for energy consumption.

The target communication rate for communicating data packets between the telematics controller 15 and the second controller 95 is described and defined as a minimum guaranteed bit rate (GBR) for communicating data packets in a manner that is acceptable to the client. In one embodiment, the minimum GBR is based on a 5QI (5G QoS identifier) standard for cellular, or is a minimum best-effort bit rate that is defined as a quasi-QOS for Best Effort. In one embodiment, the target communication rate is a guaranteed minimum GBR, a best effort GBR, or some other measurable target communication rate.

Proportionate allocation is defined as allocating or dividing the communication of a plurality of data packets in a manner that ensures that each of the plurality of available wireless communication links carries a proportionate part of the total communication load, i.e., the target communication rate, to communicate the data packets.

The concepts described herein employ parameters related to communication rates and energy consumption to command and control uplink communication from a mobile UE, including during periods when the mobile UE is idle, e.g., in an ignition-off mode.

While the best modes for carrying out the disclosure have been described in detail, those familiar with the art to which this disclosure relates will recognize various alternative designs and embodiments lying within the scope of the appended claims. It is intended that all matter contained in the above description and/or shown in the accompanying drawings shall be interpreted as illustrative and not as limiting.

What is claimed is:

1. A telematics system for a mobile user equipment (UE), comprising:
    a telematics controller, wherein the telematics controller is configured to wirelessly communicate via a plurality of communication channels;
    the telematics controller including an instruction set, the instruction set being executable to:
        determine, for each of the plurality of communication channels, a parameter related to data throughput and energy consumption to effect an uplink communication between the telematics controller and a second device when the mobile UE is in a low-power operating mode;
        compare, for each of a plurality of communication channels, the parameter related to data throughput and energy consumption to effect the uplink communication between the telematics controller and the second device with a minimum threshold;
        select one of the plurality of communication channels, wherein the parameter related to data throughput and energy consumption to effect the uplink communication between the telematics controller and the second device for the one of the plurality of communication channels is greater than the minimum threshold; and
        communicate between the telematics controller and the second device via the one of the plurality of communication channels when the mobile UE is in the low-power operating mode.

2. The telematics system of claim 1, wherein the parameter related to data throughput and energy consumption comprises a guaranteed bit rate (GBR) for the uplink communication for a respective one of the plurality of communication channels.

3. The telematics system of claim 1, wherein the parameter related to data throughput and energy consumption comprises one of a reference signal reserved power (RSRP), a reference signal reserved quality (RSRQ), or a signal-to-noise ratio (SNR) for the uplink communication for a respective one of the plurality of communication channels.

4. The telematics system of claim 1, comprising executing an apriority scanning routine to determine, for each of the plurality of communication channels, the parameters related to data throughput and energy consumption to effect the uplink communication between the telematics controller and the second device when the mobile UE is in the low-power operating mode.

5. The telematics system of claim 1, further comprising the instruction set being executable to select a second of the plurality of communication channels, wherein the parameters related to data throughput and energy consumption to effect the uplink communication between the telematics controller and the second device for the second of the plurality of communication channels is greater than the minimum threshold.

6. The telematics system of claim 5, further comprising the instruction set being executable to communicate between the telematics controller and the second device via the one of the plurality of communication channels and the second of the plurality of communication channels when the mobile UE is in the low-power operating mode.

7. The telematics system of claim 6, further comprising the telematics controller being configured to proportionately allocate communication via the one of the plurality of communication channels and the second of the plurality of communication channels based upon a target communication rate, a first communication rate that is associated with the one of the plurality of communication channels, and a second communication rate that is associated with the second of the plurality of communication channels.

8. The telematics system of claim 1, wherein the plurality of communication channels comprises at least one of 3G, 4G, 4G LTE, 5G, 6G, DSRC, and WiFi.

9. The telematics system of claim 1, wherein the instruction set being executable to communicate between the telematics controller and the second device via the one of the plurality of communication channels when the mobile UE is in the low-power operating mode comprises the instruction set being executable to execute an uplink communication from the telematics controller to the second device via the one of the plurality of communication channels when the mobile UE is in the low-power operating mode.

10. The telematics system of claim 1, wherein the low-power mode comprises an ignition-off, discontinuous reception idle (DRX-idle) mode.

11. The telematics system of claim 1, further comprising the instruction set being executable to deselect a second of the plurality of communication channels, wherein the parameters related to data throughput and energy consumption to effect the uplink communication between the telematics controller and the second device for the second of the plurality of communication channels is less than the minimum threshold; and disable communication between the telematics controller and the second device via the second of the plurality of communication channels when the mobile UE is in the low-power operating mode.

12. The telematics system of claim 1, further comprising the telematics controller employing a radio resource control (RRC) protocol to manage communication between the telematics controller and the second device when the mobile UE is in the low-power operating mode.

13. A telematics system for a mobile user equipment (UE), comprising:

a telematics controller, wherein the telematics controller is configured to wirelessly communicate via a plurality of communication channels;

the telematics controller including an instruction set, the instruction set being executable to:

determine, for each of the plurality of communication channels, a parameter related to data throughput and energy consumption to effect an uplink communication between the telematics controller and a second device;

compare, for each of a plurality of communication channels, the parameter related to data throughput and energy consumption to effect the uplink communication between the telematics controller and the second device with a minimum threshold;

select one of the plurality of communication channels, wherein the parameter related to data throughput and energy consumption to effect the uplink communication between the telematics controller and the second device for the one of the plurality of communication channels is greater than the minimum threshold; and communicate between the telematics controller and the second device via the one of the plurality of communication channels.

14. The telematics system of claim 13, wherein the parameter related to data throughput and energy consumption comprises a guaranteed bit rate (GBR) for the uplink communication for a respective one of the plurality of communication channels.

15. The telematics system of claim 13, wherein the parameter related to data throughput and energy consumption comprises one of a reference signal reserved power (RSRP), a reference signal reserved quality (RSRQ), or a signal-to-noise ratio (SNR) for the uplink communication for a respective one of the plurality of communication channels.

16. The telematics system of claim 13, comprising executing an apriority scanning routine to determine, for each of the plurality of communication channels, the parameters related to data throughput and energy consumption to effect the uplink communication between the telematics controller and the second device.

17. The telematics system of claim 13, further comprising the instruction set being executable to select a second of the plurality of communication channels, wherein the parameters related to data throughput and energy consumption to effect the uplink communication between the telematics controller and the second device for the second of the plurality of communication channels is greater than the minimum threshold.

18. The telematics system of claim 17, further comprising the instruction set being executable to communicate between the telematics controller and the second device via the one of the plurality of communication channels and the second of the plurality of communication channels.

19. The telematics system of claim 18, further comprising the telematics controller being configured to proportionately allocate communication via the one of the plurality of communication channels and the second of the plurality of communication channels based upon a target communication rate, a first communication rate that is associated with the one of the plurality of communication channels, and a second communication rate that is associated with the second of the plurality of communication channels.

20. A method for controlling a telematics system for a mobile user equipment (UE), the method comprising:

determining, for each of a plurality of communication channels, a parameter related to data throughput and energy consumption to effect an uplink communication between the telematics controller and a second device when the mobile UE is in a low-power operating mode;

comparing, for each of a plurality of communication channels, the parameter related to data throughput and energy consumption to effect the uplink communication between the telematics controller and the second device with a minimum threshold;

selecting one of the plurality of communication channels, wherein the parameter related to data throughput and energy consumption to effect the uplink communication between the telematics controller and the second device for the one of the plurality of communication channels is greater than the minimum threshold; and communicating between the telematics controller and the second device via the one of the plurality of communication channels when the mobile UE is in the low-power operating mode.

* * * * *